3,115,175
PROCESS FOR CHEMICALLY PEELING PEARS

Malcolm Wallace Loveland, Orinda, Calif., assignor to Atlas Pacific Engineering Company, a corporation of California
No Drawing. Filed May 31, 1962, Ser. No. 198,740
4 Claims. (Cl. 146—234)

This invention relates to a process for peeling fruits and vegetables and particularly to the peeling of pears.

It has been proposed heretofore to apply various corrosive alkaline materials such as sodium hydroxide and potassium hydroxide to the skin of the fruit or the vegetable to loosen the skin so that thereafter it can be readily removed by a simple spray operation or by brushing. To hasten the action of the chemical, it is also usual to effect application of the corrosive material at a relatively elevated temperature, usually one substantially above the boiling point of water.

As used heretofore, the fruits or vegetables have been maintained in contact with the hot corrosive chemical at an elevated temperature for such a period of time as is necessary to effect a chemical disintegration of the skin. Usually this temperature has been so high that by the time the chemical has decomposed the skin sufficiently the heat has penetrated into the fruit beyond the skin, producing a softened cooked layer of a depth of $\frac{1}{8}$ inch and more. This cooking is highly undesirable because when the skin is subsequently removed by application of some abrasive force such as that applied by a brush or a stream of water, most of the cooked layer will be removed along with the skin. Since the desired depth of peeling is only $\frac{1}{16}$ inch or less, it will be obvious that the peeling loss will be increased. Also, to the extent that the partially cooked flesh of the fruit or vegetable remains, the quality of the fruit is reduced, because the partially cooked flesh which has reached a temperature of about 150° or 160° F. rapidly discolors and turns brown. During subsequent handling of the fruit, particularly during the sterilization cooking of the fruit in a can, the cooked layer still remaining becomes excessively cooked and is easily dislodged to cloud the syrup or brine.

Application of the chemical peeling solution at or below the cooking temperature has been proposed. The contact time required, however, of the minimum order of ten minutes and longer, renders such an operation commercially impractical because the volume of product undergoing treatment requires apparatus of impractical size.

I have found that one can effectively break down and soften the skin of a fruit such as a pear by application for a relatively short time of a relatively strong solution of a corrosive chemical at a temperature which is elevated above the cooking temperature of the fruit flesh. Immediately thereafter and as the next step in the process of removing the skin, the fruit is again wet with a second corrosive solution. This solution, however, is preferably at a second temperature which is below the cooking temperature and substantially below that at which the first corrosive solution was applied so that the second solution takes up heat from the fruit and so prevents the heat from penetrating into the fruit below the skin layer.

Following application of the second solution, I apply a third corrosive solution and this at a temperature of the order of that employed for the first solution. I have found that by making three solution applications, the first and third at relatively elevated temperatures and the intermediate or second at a relatively lower temperature the penetration of heat into the fruit can be restricted to the skin layer while adequate skin disintegration can be achieved.

The effect desired is to cook and soften as well as chemically disintegrate only the skin zone. The actual chemical penetration does not follow the heat penetration. The chemical penetration is limited to the depth the chemical can reach by disintegration in the time allowed. The main reason for the use of a high temperature is to speed the chemical action. The hot, cold and hot baths hold the heat penetration in check in the fruit and ensure that the layer immediately underlying the skin does not exceed about 160° F. The temperature difference of the first and second solutions should be such that the second solution takes up heat from the surface of the fruits or vegetables undergoing treatment and heat penetration into the flesh of the fruit below the skin is obviated.

When a single high temperature bath is employed and deep heat penetration has occurred, one will find on pears, for example, a cell layer immediately beneath the skin which has been cooked. This layer is relatively transparent and generally of a thickness of about $\frac{1}{16}$ inch. If this layer is not removed, it reduces the quality of the fruit, for it carries over and may be evident after the pears have been canned. Deep heat penetration also activates the enzymes near the surface, and quite frequently this activity may result in an increase in the carotene content and the fruit will have a surface of a yellow color. By confining the zone in the fruit which reaches about 160° F. to the chemically attacked zone, the transition layer where the enzymes have been activated is held to the depth easily removed as by washing or brushing. The enzyme activation temperature is about 160° F. according to the literature. Cooking of the skin layer makes the skin easier to remove both chemically and mechanically.

By coordinating the three temperatures and the time of contact, heat penetration into the fruit can be restricted to the skin layer while heating of the fruit immediately adjacent the skin layer is such that this region of the fruit does not attain nor exceed 160° F. This is important because pear flesh heated to 160° F. or above turns soft and takes on a brown color. For example, employing only a 40% solution of sodium hydroxide at 240° F., the treatment time is of the order of a minute. Because of the long treatment time at the elevated temperature, the surface of the fruit is cooked and softened to a depth such that the resulting loss is so great that the overall yield is reduced substantially. This loss in yield can be reduced by using a two-step process. For example, by applying a 40% caustic for about 30 seconds at about 225° F. followed by 40% caustic at 150° F. for 90 seconds, the yield was increased because the fruit was not cooked to an excessive depth. The two-step process is described and claimed in my co-pending application Serial No. 144,313, filed October 11, 1961.

Utilizing three 40% caustic solutions and immersing the fruit for 20 seconds at 245° F. followed by immersion at 120° F. for 30 seconds and for 15 seconds in a third solution at 245° F. followed by a cold water wash with five seconds between each immersion for effecting transfer, the total treatment time was 75 seconds, and the yield was increased substantially over the two-step process. The 20 seconds at 245° F. gave the maximum desired heat penetration and good primary disintegration. The 120° F. solution for 30 seconds checked the heat penetration more effectively than the 150° F. solution while continuing the action of the caustic but at a reduced rate. The third solution at 245° F. for 15 seconds completed the action. The 15 second time does not exceed the maximum heat penetration consistent with a good yield. A final wash for about 20 seconds with cold water, e.g. about 60–70° F., checks the heat penetration and washes off the caustic.

The length of time of application of the chemical, the concentration of the chemical and the temperature of the chemical must be coordinated. That is, as the strength of the solution is increased, the temperature and time of contact can each be reduced. Also, as the temperature is increased at a given concentration of the chemical, the time of contact can be reduced. By experimentation, one can readily determine the optimum conditions for a given fruit or vegetable, as well as that temperature at which cooking occurs for a particular fruit or vegetable.

The individual factors are not separately critical for, as I have indicated, if two of the factors are maintained constant, the third can be varied to obtain optimum results. Thus, one can, by maintaining a solution of a constant strength and at a given temperature, secure adequate variation by altering the period of time during which the fruit or vegetable is subject to application of a solution. This is easily achieved, for example, by varying the speed of a conveyor moving the fruit or vegetable through a treatment zone while maintaining the other factors constant. Instead of varying the period of treatment, one can vary the temperature or the concentration while maintaining the other factors constant. What one must achieve is a rapid destruction of the skin without any substantial heat penetration below the skin of the fruit or the vegetable.

In general, the temperature of the second solution should be substantially lower than the cooking temperature of the fruit or vegetable and the temperature of the first solution. I usually employ temperatures such that the difference is of the order of 50° F. or more. Also, generally the higher the temperature of the first solution, the greater should be the temperature differential between that temperature and the temperature of the second solution to ensure that heat penetration is held to a minimum and the heat is withdrawn. The application of the heat and its immediate withdrawal localizes the heat in the skin layer of the fruit so that the effective action of the chemical and heat is confined largely to the epiderm or skin layer.

By utilizing a relatively strong caustic solution in the first application at a temperature above the cooking temperature of the fruit or vegetable, quick-wetting of the skin is effected and the skin remains wet with the chemical when application of the chemical is discontinued. This is important because if the chemical drains from the surface of the fruit or vegetable, then areas of the skin will be left relatively untouched and the action of the corrosive chemical on the skin will not be uniform. Contact of the chemical may be improved by employing a wetting agent.

Preferably, the composition of the caustic solutions employed should be compatible so that no chemical reaction occurs as between the chemical adhering from the first solution upon contact with the second solution. The solutions may differ in strength but basically they should be of the same essential composition so to be compatible. Thus, one should use solutions of the same chemical such as solutions of sodium hydroxide or potassium hydroxide. To avoid substantial alteration in the strength of the solutions employed in the second and third steps, their concentration is preferably the same as that in the first bath.

As apparatus, one can employ any suitable equipment which avoids bruising of the fruit. For example, with pears having the stem still attached, one should avoid tumbling of the fruit; otherwise, the stem will pierce the flesh of another pear and so damage the fruit.

The apparatus used to transfer the fruit from one treatment zone to the next should act relatively rapidly and effectively; otherwise, the heat content of the epiderm and hypoderm layers of the fruit will penetrate the fruit flesh in the time between the high temperature treatment zone and the application of the colder solution in the next treatment zone. If the first solution adheres to the fruit, one can even omit application of the second solution providing the fruit is so handled that heat penetration into the fruit flesh is prevented. This can be achieved by passing the wet fruit through a zone wherein the fruit surface is cooled so that the heat on the surface of the fruit does not penetrate the fruit. In practical effect this is equivalent to application of the second solution at a temperature below the fruit cooking temperature.

With some products it is desirable to shorten the time of wetting with the first solution and introduce a holding period between application of the solutions to allow the heat in the skin to flow further towards the flesh and yet not elevate the flesh above the cooking temperature. This can effect some economy in use of caustic and prolongs the time that the skin is above the cooking temperature without further addition of heat.

As an outline of the conditions useful in the practice of the invention, I have successfully used solutions of sodium or potassium hydroxide at concentrations between about 5% and about 50% by weight to provide the first solution. On pears, for example, I have employed solutions of these strengths at temperatures above about 160° F., the temperature at which the flesh of pears is undesirably altered. I have used temperatures as high as 250° F. successfully. One is not limited to any specific upper temperature but, to ensure rapid chemical action, the temperature should be substantially elevated above the cooking temperature of the fruit or vegetable. The time of contact will vary with the strength of the solution and the temperature; for example, a 40% sodium hydroxide solution requires about ten minutes or longer at 160° F. and only about from one to two minutes at 220° F. to effect a complete disintegration of the skin.

A treatment at 160° F. for ten minutes will result in elevating a layer of substantial depth of the fruit to a temperature which activates the enzyme while softening the outer layer of the fruit so that it can be removed easily. The depth of the heated layer may be about ¼ inch while the chemical will only have penetrated about $\frac{1}{16}$ inch. The chemical will adequately destroy the skin, yet the deep-heated layer will rapidly turn brown and must be removed with a consequent loss in yield. The 160° F. treatment is a useless one because of the discoloration of the fruit and because of the great quantity of machinery required to handle the fruit at this temperature and long retention time.

The treatment at 220° F. for one to two minutes is not acceptable because the depth of the cooked layer is much deeper than the chemically disintegrated layer. This results in a loss of yield; also it moves the activated enzyme layer some $\frac{1}{16}$ inch below the layer removed by abrasion so that the fruit surface may later deteriorate. Thus, any delay in canning and reaching a high enough temperature to stop the enzyme action results in a brown layer of a depth of about $\frac{1}{16}$ inch and from $\frac{1}{32}$ inch to $\frac{1}{16}$ inch below the peeled surface. This is a permanent discoloration and renders the fruit unfit for sale.

I prefer to use such solution strengths and such temperatures as require initially a relatively short contact period for the first solution contact, preferably one measured in seconds, from about five to about fifty seconds, for these prevent deep heat penetration, adequately cooking and softening only the epiderm and the hypoderm to prepare them for easy attack by the adhering chemical and the solution in the next treatment zone, all with good apparatus capacity.

For the second solution, I have employed those of a strength between 5 and 50%. The temperature of the second solution is below the cooking temperature of the fruit and is such that it abstracts heat from the fruit when applied to the fruit. Because the second solution is always at a temperature which is below the cooking temperature of the fruit and usually about 50° F. or more below the temperature of the first solution, the contact time can be slightly longer and in any case sufficiently long as to abstract heat from the fruit surface and to prevent heat penetration into the fruit below the skin and the immediately adjacent layer of flesh. If desired, the economy of the caustic utilization can be increased by employing solutions containing a chloride such as sodium chloride; see Patent 2,399,282.

For the third solution, I have employed those of a strength between 5 and 50%. As I have indicated earlier, it is preferred that the three solutions be of approximately the same strength so that no substantial alteration occurs in the strength of a solution from an earlier solution. For example, if the second solution is of a concentration substantially greater than that of the third solution, then the difference will gradually cause the concentration of the third solution to increase. This will introduce a variable of unknown magnitude into the situation.

The temperature of the third solution is preferably above that of the second solution. With the temperature of the surface of the fruit reduced by application of the cold second solution, the third solution application is effected to cause a further rapid deterioration of the skin and the layer of cells immediately beneath the skin whereby the overall treatment time is substantially reduced. Washing the fruit with fresh cold water checks the heat penetration and removes the caustic.

The following tests show the results obtained on pears suitable for canning. The pressure test is that well known in the industry. The three solutions each contained approximately 40% NaOH. Immersion was effected for 20 seconds in the first bath at 245° F., for 30 seconds in the second bath at 120° F. and for 15 seconds in the third bath again at 245° F. The transfer time between baths was approximately five seconds so the overall time was 75 seconds. The weight loss of a pear of the same size and pressure test under the condition of excellent mechanical peeling is given for comparison.

| Pressure Test | Chemical Peeling, Percent Weight Loss | Mechanical Peeling, Percent Weight Loss |
|---|---|---|
| 8 | 13.0 | 16.0 |
| 5 | 14.4 | 16.0 |
| 8 | 12.0 | 14.75 |
| 6 | 13.4 | 15.0 |
| 4½ | 12.7 | 13.0 |
| 8 | 14.9 | 20.0 |
| 5½ | 14.5 | 19.0 |
| 4 | 15.7 | 20.5 |
| 7½ | 15.5 | 18.5 |
| 4 | 14.5 | 16.0 |
| 5 | 13.1 | 13.5 |
| 9 | 12.3 | 12.5 |
| 9 | 11.2 | 12.5 |
| 5½ | 13.8 | 15.0 |
| 8 | 12.8 | 13.0 |
| Average | 13.6 | 15.8 |

After application of the corrosive chemicals, the fruit was lightly washed with water to remove the adhering skin and chemical, then brushed to remove any adhering skin and again lightly washed. The loss in weight in each instance was substantially less than that encountered with fruit peeled on a well-adjusted commercial pear peeling machine. Firmer pears (8–10 pounds pressure test) peeled equally well under the same treatment. The range of from about 2½ to 10 pounds represents the range normally encountered, the higher pressures being used for pears to be diced, while those in the lower pressure range are used for canning as halves. With adjustment of one or more of the three variables, much greener fruit can be peeled.

While I have dealt specifically with pears in the above, the invention can be applied effectively and to advantage to other fruits and to vegetables.

Any remaining alkali can be neutralized as by a citric acid solution or with a dilute hydrochloric acid followed by a water wash. To prevent the fruit from turning brown after peeling and prior to canning, it can be washed with a solution of sodium chloride; a sodium sulfite solution can also be used.

While in the foregoing we have mentioned the use of sodium hydroxide, one can use potassium hydroxide as well, and generally within the limits indicated. Here again the essential is the use of the relatively cold second solution application to keep the heat from penetrating into the fruit. A first potassium hydroxide solution containing 40% potassium hydroxide was applied for 20 seconds at 240° F. The fruit was then removed and treated with a second solution containing 40% potassium hydroxide. The fruit was held in contact with the second solution for 30 seconds at 120° F., and then with a 40% solution at 240° F. for 15 seconds. It was then washed, brushed and washed again. Again the loss was substantially less than that encountered in good machine peeling.

I claim:

1. A process for removing the outer skin on fruit and the like comprising wetting the fruit for a first period of at least five seconds with a first caustic solution containing up to about 50% by weight of caustic and maintained at a temperature elevated above 160° F., then removing the wet fruit from contact with said first caustic solution, wetting the fruit for a second period substantially longer than said first period with a second caustic solution containing up to about 50% by weight of caustic and maintained at a temperature below about 160° F. and at least 50° F. below said first temperature, removing the fruit from contact with the second caustic solution, then wetting the fruit for a third period of time of at least five seconds with a third caustic solution containing up to about 50% by weight of caustic and maintained at a temperature elevated above 160° F., washing the fruit with cold water, and removing the skin from the fruit.

2. A process for removing the outer skin on fruit and the like comprising wetting the fruit for a first time period of 20 seconds with a first caustic solution containing about 40% by weight of caustic and maintained at a temperature of about 245° F., then removing the wet fruit from contact with said first caustic solution and wetting the fruit for a second time period of about 30 seconds in a second caustic solution containing about 40% by weight of caustic and maintained at a temperature of about 120° F., removing the fruit from contact with the second caustic solution, then wetting the fruit for a third time period of about 15 seconds with a third caustic solution containing about 40% by weight of caustic and maintained at a temperature of about 245° F., and removing the skin from the fruit.

3. A process as in claim 2 wherein the fruit is washed with water following application of the third caustic solution.

4. A process as in claim 2 wherein the fruit is washed with a cold acid following application of the third caustic solution.

References Cited in the file of this patent

UNITED STATES PATENTS

| 1,394,138 | Bost et al. | Oct. 18, 1921 |
| 1,655,690 | Dunkley | Jan. 10, 1928 |
| 1,721,929 | Steinwand | July 23, 1929 |